United States Patent [19]

Marson

[11] Patent Number: 4,840,582

[45] Date of Patent: Jun. 20, 1989

[54] MODULAR PLUG IDENTIFICATION TAG

[75] Inventor: Albert U. Marson, Riverview, Mich.

[73] Assignee: Michigan Bell Telephone Company, Mich.

[21] Appl. No.: 210,318

[22] Filed: Jun. 22, 1988

[51] Int. Cl.$^4$ ............................................. H01R 13/50
[52] U.S. Cl. .................................................... 439/491
[58] Field of Search ................................ 439/488–491

[56] References Cited

U.S. PATENT DOCUMENTS 3,945,706 3/1976 Steiner ................................ 439/491
4,620,765 11/1986 Knickerbocker ................... 439/488
4,637,676 1/1987 Simonsen et al. .................. 439/488

Primary Examiner—Joseph H. McGlynn
Attorney, Agent, or Firm—Harness, Dickey & Pierce

[57] ABSTRACT

The present invention is an identification tag for cooperating with a modular jack. The tag includes a body portion for allowing indicia to be placed thereon and a tab portion connected to the body portion. The tag further includes means for allowing pivotal movement between the tab portion and the body portion relative to each other for inserting and removably locking the tag into a cavity of the modular jack.

8 Claims, 3 Drawing Sheets

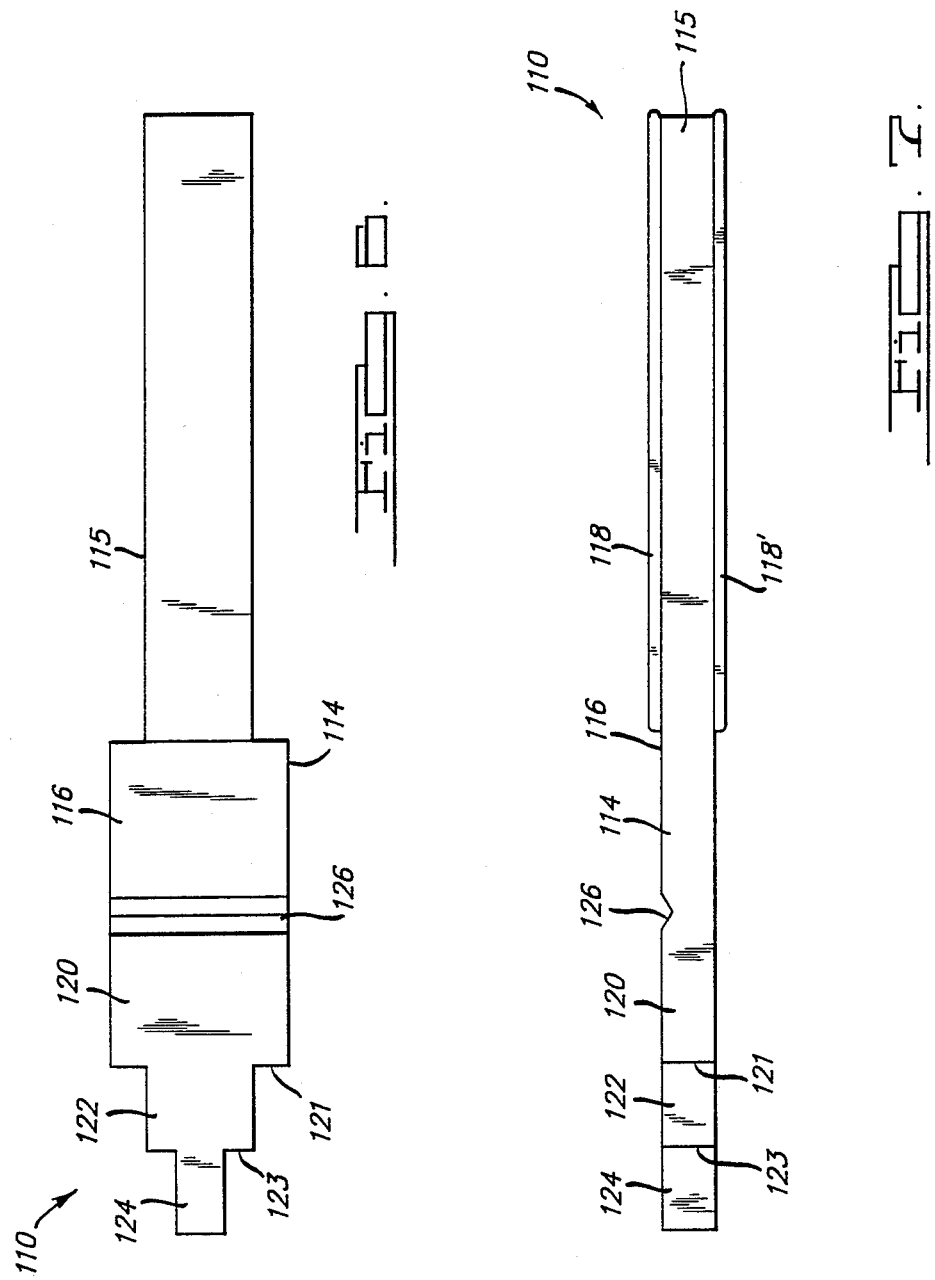

MODULAR PLUG IDENTIFICATION TAG

BACKGROUND OF THE INVENTION

1. Field of the Invention

The present invention relates to identification tags, and more particularly, to an identification tag for cooperating with a modular jack.

2. Description of Related Art

Modular plugs and jacks are used as quick disconnection electrical wire connectors. These modular plugs and jacks are commonly utilized with devices such as telephones. Typically, the modular jack is fixedly secured to a support surface while the modular plug is connected to the telephone. This arrangement allows the telephone to be moved to various locations by disconnecting the modular plug from the jack.

Generally, the modular plug is rectangular in shape and has a flexible, resilient locking member fixedly secured at one end to a surface of the plug. The modular jack includes a rectangular cavity having a stepped portion with a pair of laterally spaced stops at the opening of the cavity. The modular plug is removably locked or secured in the cavity of the modular jack by depressing the locking member, inserting the plug into the jack, and releasing the locking member. The locking member engages the pair of stops to prevent axial movement between the plug and the cavity of the jack. The process is reversed for removing the plug from the jack.

In the consumer market, a customer may desire to have a modular jack installed in particular location. Since these modular jacks come in various sizes, confusion may result as to the particular modular jack to be installed by the installation person. Further, once the modular jacks are installed, confusion may result as to which particular modular jack is to be used, especially if a multitude of similar size modular jacks have been installed.

Various attempts have been made to prevent this confusion such as having a name-sheet filled in with pertinent information to be packaged with the modular jack or tying a tag with pertinent information to the modular jack. However, these are not convenient ways of labeling or marking the modular jack with pertinent information, such as customer name or location, prior to the jack being used. Also, the name-sheet or the tied on tag may be separated from the jack once it is installed.

SUMMARY OF THE INVENTION

The present invention is an identification tag for cooperating with a modular jack. The tag includes a body portion for allowing indicia to be placed thereon. The tag also includes a tab portion connected to the body portion. The tag further includes means for allowing pivotal movement between the tab portion and the body portion relative to each other for inserting and removably locking the tag into a cavity of the modular jack.

Accordingly, the present invention provides an advantage of being removably secured to the modular jack, preventing separation between the two during shipping and once installed. Another advantage of the present invention is that it provides quick and easy updating of information for the modular jack. Additionally, the present invention may be reused, resulting in a cost savings.

BRIEF DESCRIPTION OF THE DRAWINGS

Other advantages of the present invention will be readily appreciated as the same becomes better understood by reference to the following detailed description when considered in connection with the accompanying drawings wherein:

FIG. 5 is a side elevational view partially broken of the tag cooperating with the modular jack;

FIG. 6 is a plan view of an alternate embodiment of the tag according to the present invention; and FIG. 7 is an elevational view of the tag of FIG. 6.

DESCRIPTION OF THE PREFERRED EMBODIMENT

Figure 1:
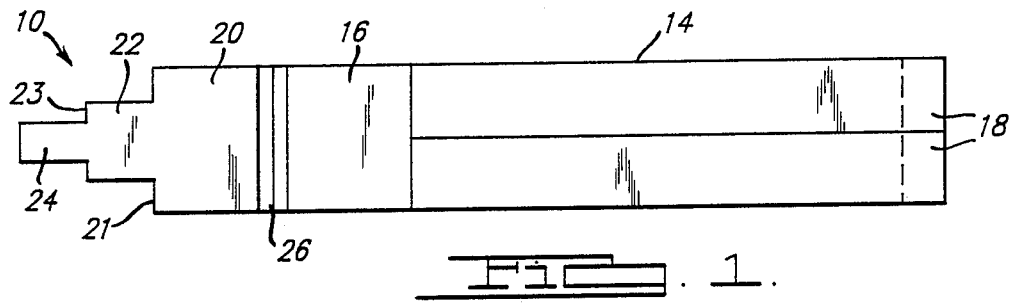
FIG. 1 is a plan view of the tag according to the present invention.
Figure 2:
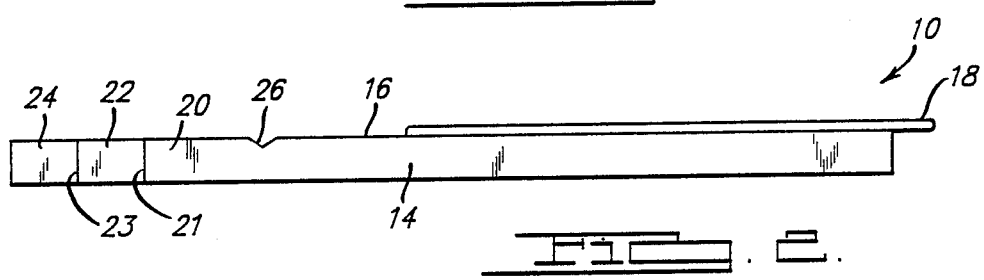
FIG. 2 is an elevational view of the tag of FIG. 1.

Referring to FIGS. 1 and 2, an identification tag 10 for cooperating with a modular jack 12 (FIGS. 3 and 4) is shown. The tag 10 includes a body portion 14 which is generally rectangular in shape. The body portion 14 has a surface 16 with a texture such that a removable paper label 18 adheres temporarily to the surface 16 until removed by a lifting action. This textured surface 16 leaves the label 18 in a condition to be attached to other surfaces. The label 18 may be one piece or multiple pieces. The width and length of the label 18 depends on the size needed for the information to be placed on the label 18. The label 18 may be of a length to overlap one end of the body portion + 14, if preferred, to facilitate removal. It should be appreciated that the body portion 14 may be greater in width than the tab portion 20 to allow more indicia to be placed on the tag 10.

The tag 10 also includes a tab portion 20 connected to, preferably integral with, one end of the body portion 14. The tab portion 20 has a generally rectangular stepped portion 22 extending from one end and of a width less than the tab portion 20. The tab portion 20 also has a generally rectangular tab release portion 24 extending from one end of the stepped portion 22. "Shoulders" 21 and 23 are formed on the tag 20 between the stepped portions 20, 22 and 24.

The tag 10 further includes a generally "V" shaped score line or groove 26 transversely formed in the tag 10 between the tab portion 20 and the body portion 14. The score line 26 allows bending or pivotal movement between the tab portion 20 and the body portion 14 relative to each other.

The tag 10 is made from a suitable polymer material such as non-conductive vinyl. This allows bending of the tab portion 20 along the score line 26 without breaking, but with enough stiffness or rigidity to prevent bending at other points. The polymer material also provides some resiliency to allow the tab portion 20 to partially return to its original configuration as illustrated in FIG. 2.

Figure 3:
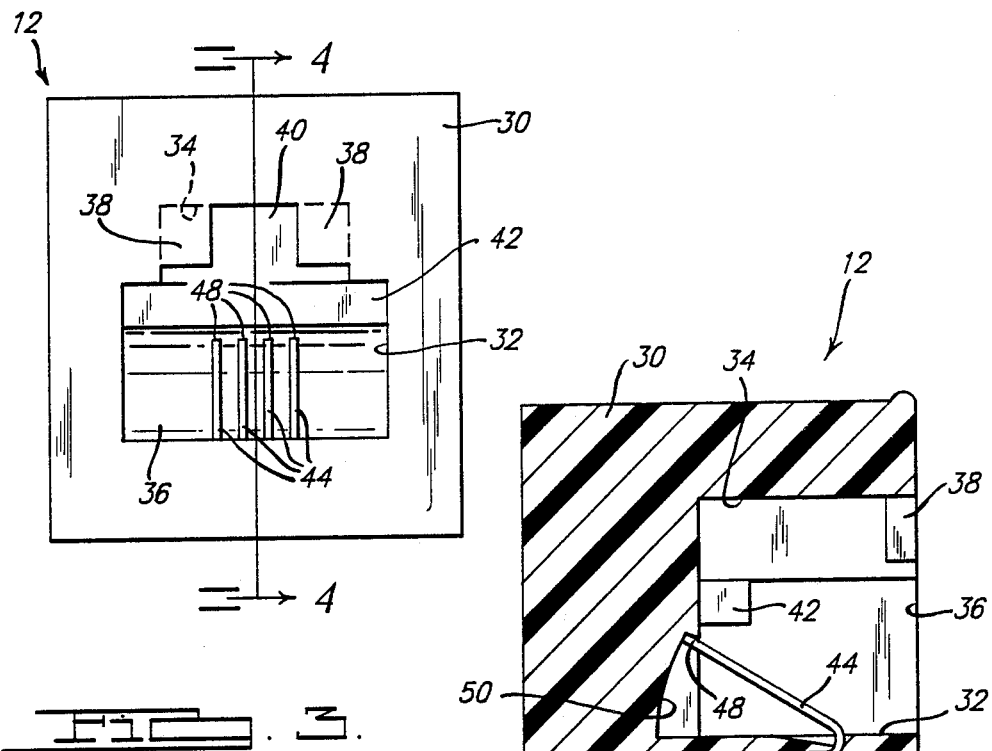
FIG. 3 is a front elevational view of a modular jack used in conjunction with the tag of FIGS. 1 and 2.
Figure 4:
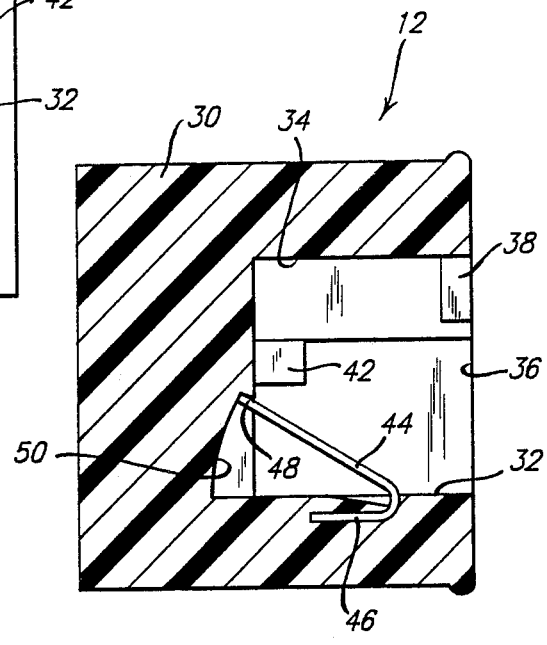
FIG. 4 is a sectional view of the modular jack taken along line 4—4 of FIG. 3.
Figure 3:
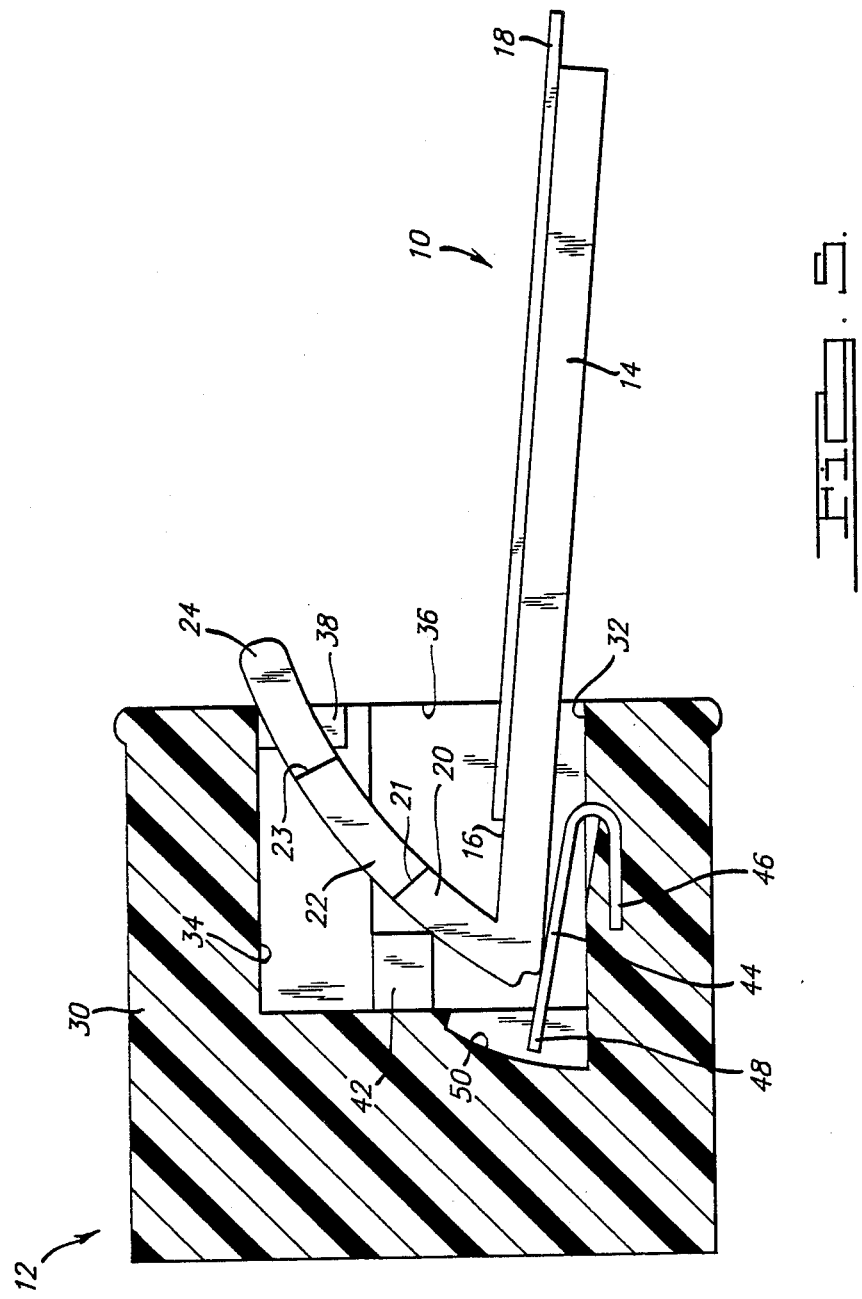

Referring to FIGS. 3 and 4, a modular jack 12 which cooperates with the tag 10 is shown. The jack 12 comprises a housing 30, generally rectangular shape. The housing 30 forms a cavity 32 which is generally rectangular shape. The cavity 32 has a stepped tab keeper portion 34 extending from one of its sides. The housing 30 also forms an opening or aperture 36 at one end of the cavity 32. Tab keepers 38, being generally rectangular in shape, are disposed in the two lateral corners of the tab keeper portion 34 and leave a space 40 between them. A generally rectangular stop 42 is secured by suitable means to an end surface of the cavity 32 adjacent the juncture tab keeper portion 34. A spring 44 formed from a plurality of laterally spaced electrical wires has one end 46 secured to a side surface of the cavity 32 and the other end 48 is free to pivotally move in an arcuate portion 50 of the cavity 32 relative to its secured end 46.

In operation, the operator places indicia of pertinent information on a label 18. The label 18 is adhesively secured to the surface 16 of the body portion 14. The label 18 is preferably divided into two parts so that the tag 10 can be reused another time (with different identification indicia) or so that identical information can be included on both parts and one-half taken off and stuck to a master list associated with a bank of modular jacks. The tab portion 20 is pivotally rotated or bent toward the body portion 14. The tag 10 is then inserted into the cavity 32 of the jack 12 until the tab portion 20 contacts or is stopped by the stop 42. Simultaneously, the spring 44 is compressed. The tab portion 20 is then released. Due to the resiliency of tag 10, the tab portion 20 rotates a limited amount until the tab release portion 24 contacts or is stopped by the housing 30. The shoulder 23 between stepped portions 22 and 24 of the tab portion 20 is located within the cavity 32 behind the tab keepers 38. The spring 44 biases the shoulder 23 of the tab portion 20 toward the housing surface and against the tab keepers 38. If the tag 10 is moved axially, the stepped portion 22 which engage the tab keepers 38 prevents the tag 10 from being removed from the cavity 32 of the modular jack 12.

For removing the tag 10 from the jack 12, the operator depresses or bends the tab portion 20 toward the body portion 14 until the stepped portion 22 disengages the tab keepers 38. The tag 10 is moved axially to remove the tag from the modular jack 12 and the tab portion 20 is released.

Referring to FIG. 6, an alternate embodiment of the tag 10 is shown at 110. Like parts have like numerals increased by one hundred. The tag 110 includes a body portion 114 having a receiving portion 115 for receiving a label 118. The receiving portion 115 has a width less than the width of the body portion 114. Additionally, a label 118 and 118$^1$ may be placed on both sides of the receiving portion 115, as shown in FIG. 7. This provides easier manufacturing of the tag 110 as opposed to two labels 18 on the same side as shown in FIG. 1.

The subject invention has been described in an illustrative manner. It is, therefore, to be understood that the terminology which has been used is intended to be in the nature of words of description rather than of limitation. Obviously, many modifications and variations of the present invention are possible in light of the above teachings. Therefore, the present invention may be practiced otherwise than as specifically described.

What is claimed is:

1. An identification tag for cooperating with a modular jack having a housing forming a cavity therein, said tag comprising:

a body portion to allow indicia to be placed thereon;

a tab portion connected to one end of said body portion; and means for allowing pivotal movement between said tab portion and said body portion relative to each other;

whereby the tab portion is pivotally moved toward the body portion and both portions are partially inserted into the cavity and the tab portion is released to removably lock the tab within the cavity of the modular jack.

2. The invention as set forth in claim 1 wherein said means comprises a groove formed in said tag between said tab portion and said body portion to allow pivotal movement.

3. The invention as set forth in claim 2 wherein said tab portion includes a stepped portion at one end and a tab release portion extending from one end of said stepped portion, said portions engaging the housing of the modular jack to removably lock said tag within the cavity.

4. The invention as set forth in claim 3 including a removable label having the indicia and being adhesively secured to said body portion.

5. The invention as set forth in claim 4 wherein said body portion includes a surface contacting said label and being textured to allow said label to be in a condition to be attached to other surfaces.

6. The invention as set forth in claim 1 wherein said tab portion and said body portion comprise a polymer material.

7. The invention as set forth in claim 3 including a pair of removable labels having the indicia, one of said pair of removable labels being secured to one side of said body portion and the other of said pair of labels being secured to the other side of said body portion.

8. An identification tag and modular jack assembly comprising:

a modular jack having a housing forming a cavity therein;

said cavity including a stepped tab keeper portion;

a pair of laterally spaced tab keeper disposed in the lateral two corners of said tab keeper portion and leaving a space therebetween;

a tag having a body portion allowing indicia to be placed thereon and a tab portion connected to one end of said body portion;

said tab portion including a stepped portion at one end and a tab release portion extending from one end of said stepped portion;

said tag including means for allowing pivotal movement between said tab portion and said body portion relative to each other;

whereby the tab portion is pivotally moved toward the body portion and both portions are partially inserted into the cavity such that upon releasing the tab portion, the tab portion rotates a limited amount until the tab release portion contacts the housing in the space between the tab keepers and the stepped portion is located behind the tab keepers to removably lock the tag within the cavity of the modular jack.

* * * * *

UNITED STATES PATENT AND TRADEMARK OFFICE
CERTIFICATE OF CORRECTION

PATENT NO. : 4,840,582

DATED : June 20, 1989

INVENTOR(S) : Albert U. Marson

It is certified that error appears in the above-identified patent and that said Letters Patent is hereby corrected as shown below:

| | |
|---|---|
| Column 2, line 35, | "portion+" should be --portion--. |
| Column 2, line 46, | "tag 20" should be --tag 10--. |
| Column 2, line 64, | insert "in" before --shape--. |
| Column 2, line 66, | insert "in" before --shape--. |

Signed and Sealed this

Fifteenth Day of May, 1990

*Attest:*

HARRY F. MANBECK, JR.

*Attesting Officer*     *Commissioner of Patents and Trademarks*